US010662909B2

(12) United States Patent
Miyashita et al.

(10) Patent No.: US 10,662,909 B2
(45) Date of Patent: May 26, 2020

(54) ENGINE INTAKE STRUCTURE FOR VEHICLE

(71) Applicant: HONDA MOTOR CO., LTD., Minato-ku, Tokyo (JP)

(72) Inventors: Yoichi Miyashita, Wako (JP); Tamaki Watanabe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/005,866

(22) Filed: Jun. 12, 2018

(65) Prior Publication Data

US 2018/0363604 A1 Dec. 20, 2018

(30) Foreign Application Priority Data

Jun. 14, 2017 (JP) .................................. 2017-116987

(51) Int. Cl.
*F02M 35/16* (2006.01)
*B60K 13/02* (2006.01)
*F02M 35/10* (2006.01)

(52) U.S. Cl.
CPC .......... *F02M 35/161* (2013.01); *B60K 13/02* (2013.01); *F02M 35/10262* (2013.01); *F02M 35/10157* (2013.01)

(58) Field of Classification Search
CPC ........... F02M 35/161; F02M 35/10262; F02M 35/10144; F02M 35/04; F02M 35/10052
See application file for complete search history.

(56) References Cited

U.S. PATENT DOCUMENTS

| 2005/0215191 A1* | 9/2005 | Kino ...................... B60K 13/02 454/143 |
| 2005/0230162 A1* | 10/2005 | Murayama ............. B60K 11/08 180/68.1 |
| 2006/0006012 A1* | 1/2006 | Khouw .................. B60K 13/02 180/68.3 |

(Continued)

FOREIGN PATENT DOCUMENTS

| JP | 2005-343244 A | 12/2005 |
| JP | 2006027596 A | 2/2006 |

(Continued)

OTHER PUBLICATIONS

Notification of Reasons for Refusal for Japanese Patent Application No. 2017-116987, dated Oct. 23, 2018, 4 pages.

*Primary Examiner* — Long T Tran
(74) *Attorney, Agent, or Firm* — Armstrong Teasdale LLP (57) ABSTRACT

An intake structure for an internal combustion engine of a vehicle includes a cover member covering a space defined between a front side of a radiator provided in a front part of an engine room and a vehicle body opening provided in a front end of the engine room from above, and an intake duct member resting on the cover member and having an air inlet. A part of the cover member adjoining the air inlet is formed with an opening communicating the air inlet with the space, the opening defining a larger opening area in a part thereof located on a higher temperature region side of the engine room with respect to a laterally central part of the air inlet than in a part thereof located on a lower temperature region side of the engine room with respect to the laterally central part of the air inlet.

8 Claims, 4 Drawing Sheets

(56) References Cited

U.S. PATENT DOCUMENTS

| | | | |
|---|---|---|---|
| 2008/0191500 A1* | 8/2008 | Kondou | B60R 19/52 293/117 |
| 2010/0032220 A1* | 2/2010 | Ohira | F02M 35/10013 180/68.3 |
| 2011/0017535 A1* | 1/2011 | Salvesen | B60K 13/02 180/68.3 |
| 2012/0024611 A1* | 2/2012 | Ajisaka | B60K 11/08 180/68.1 |
| 2012/0048632 A1 | 3/2012 | Mehlos et al. | |
| 2015/0274003 A1* | 10/2015 | Laakso | B60K 13/02 180/68.3 |

FOREIGN PATENT DOCUMENTS

| | | |
|---|---|---|
| JP | 2012219696 A | 11/2012 |
| JP | 2013538730 A | 10/2013 |

* cited by examiner

ENGINE INTAKE STRUCTURE FOR VEHICLE

TECHNICAL FIELD

The present invention relates to an intake structure for an internal combustion engine of a vehicle.

BACKGROUND ART

In a known intake structure for a vehicle, an intake duct is positioned above an upper cross member of a front bulkhead supporting a radiator. An air inlet of the intake duct faces in an upward and forward direction to draw air from an upper part of the engine room. Additionally, the part of the vehicle body positioned directly in front of the air inlet is formed with a plurality of slots to allow the air flow impinging on the front end of the vehicle body to pass through these slots and to be forwarded to the air inlet. See JP2005-343244A, for example.

As the rotational speed of the engine increases, the flow rate of the intake air increases. According to this prior art, when the flow rate of the intake air is high, the resistance to the intake air flowing through the slots increases to such an extent that a larger part of the intake air is drawn from the upper region of the engine room. The air in the upper region of the engine room is high in temperature owing to the heat emitted from the engine as opposed to the fresh air drawn from the front end of the vehicle body via the slots. As a result, according to this prior art, the intake air drawn into the air inlet may become undesirably high in temperature.

SUMMARY OF THE INVENTION

In view of such a problem of the prior art, a primary object of the present invention is to provide an intake structure for an internal combustion engine of a vehicle which can prevent hot air in an engine room from being drawn into an air inlet of an intake duct member.

To achieve such an object, one aspect of the present invention provides an intake structure for an internal combustion engine of a vehicle, comprising: a vehicle body opening (6) formed in a part of a vehicle body (2) located in a front end part of an engine room (3) of the vehicle; a cover member (10) covering a space (12) defined between a front side of a radiator (11) provided in a front part of the engine room and the vehicle body opening from above; and an intake duct member (23) resting on the cover member and having an air inlet (21A); wherein a part of the cover member adjoining the air inlet is formed with an opening (50) communicating the air inlet with the space, the opening defining a larger opening area in a part thereof located on a higher temperature region side of the engine room with respect to a laterally central part of the air inlet than in a part thereof located on a lower temperature region side of the engine room with respect to the laterally central part of the air inlet.

Because the cover member covers the space defined between the radiator and the vehicle body opening from above, the external appearance of the engine room improves, and the fresh air drawn into the space between the radiator and the vehicle body opening is prevented from being thermally contaminated by the air in the region above the cover member. Because the opening area of the opening is greater on the side of the high temperature region of the engine room than on the side of the low temperature region of the engine room, the fresh air is drawn into the air inlet via the opening particularly actively on the high temperature region side of the engine room so that a relatively small amount of air is drawn from the upper region of the engine room on the high temperature region side of the engine room.

In a preferred embodiment of the present invention, the intake duct member is positioned so as to be offset to one side of the vehicle body, and the air inlet is provided on a front end of the intake duct member, and wherein the higher temperature region side of the engine room is located on an inboard side of the air duct member, and the lower temperature region side of the engine room is located on an outboard side of the air duct member.

This is advantageous because a central part of the engine room is relatively high in temperature. As the air inlet is provided on the front end of the intake duct member, the intake air can be particularly favorably drawn into the air inlet from the vehicle body opening via the opening when the vehicle is traveling at high speeds.

Preferably, the opening comprises a plurality of slots (51) each extending in parallel with an axial direction of the intake duct member, and arranged in a lateral direction.

Thereby, an adequate air flow through the opening can be ensured without impairing the mechanical stability or integrity of the member defining the opening, and the slots can provide an additional function of screening large foreign matters from being introduced into the air inlet.

Preferably, the slots are progressively more elongated toward the high temperature region side of the engine room.

Thereby, the opening area of the opening can be made preferentially greater on the side of the high temperature region of the engine room by using a highly simple structure.

Preferably, the intake duct member is received in a substantially complementary recess (10A) formed in the cover member.

Thereby, the intake duct member can be positioned in a space efficient manner. In particular, when the air inlet is spaced from the front wall of the recess, resistance to the air flow into the air inlet can be minimized even when the air inlet faces forward.

Preferably, the recess includes a deep region (10B) located in a front end part of the recess and provided with a greater depth than a general bottom surface of the recess.

Thereby, the air inlet may be positioned in a highly open space so that the intake air can flow into the air inlet with a minimum air resistance.

Preferably, the slots extend in a vertical front wall of the recess, a bottom wall of the deep region of the recess and a vertical rear wall of the deep region of the recess.

Thereby, the effective opening area of the opening can be maximized, and a correspondingly large amount of intake air can be drawn from the space created between the vehicle body opening and the radiator.

Preferably, the cover member is supported by an upper cross member (30) of a front bulkhead supporting the radiator.

Thereby, the intake duct member resting on the cover member can be supported by the upper cross member via the cover member in a highly stable manner, and can be positioned in a functionally optimal manner.

When the engine is positioned laterally in the engine room with an exhaust side thereof facing forward, the part of the engine room immediately in front of the engine is typically very high in temperature. Also, when a turbocharger is attached to a front side of the engine, this is the case even more.

The present invention allows relatively cool fresh air and air drawn from the low temperature region of the engine room to be supplied to the air inlet of the intake duct member even in such cases.

The present invention thus provides an intake structure for an internal combustion engine of a vehicle which can prevent hot air in an engine room from being drawn into an air inlet of an intake duct member.

DESCRIPTION OF THE PREFERRED EMBODIMENT(S)

A preferred embodiment of the present invention is described in the following with reference to the appended drawings.

Figure 1:
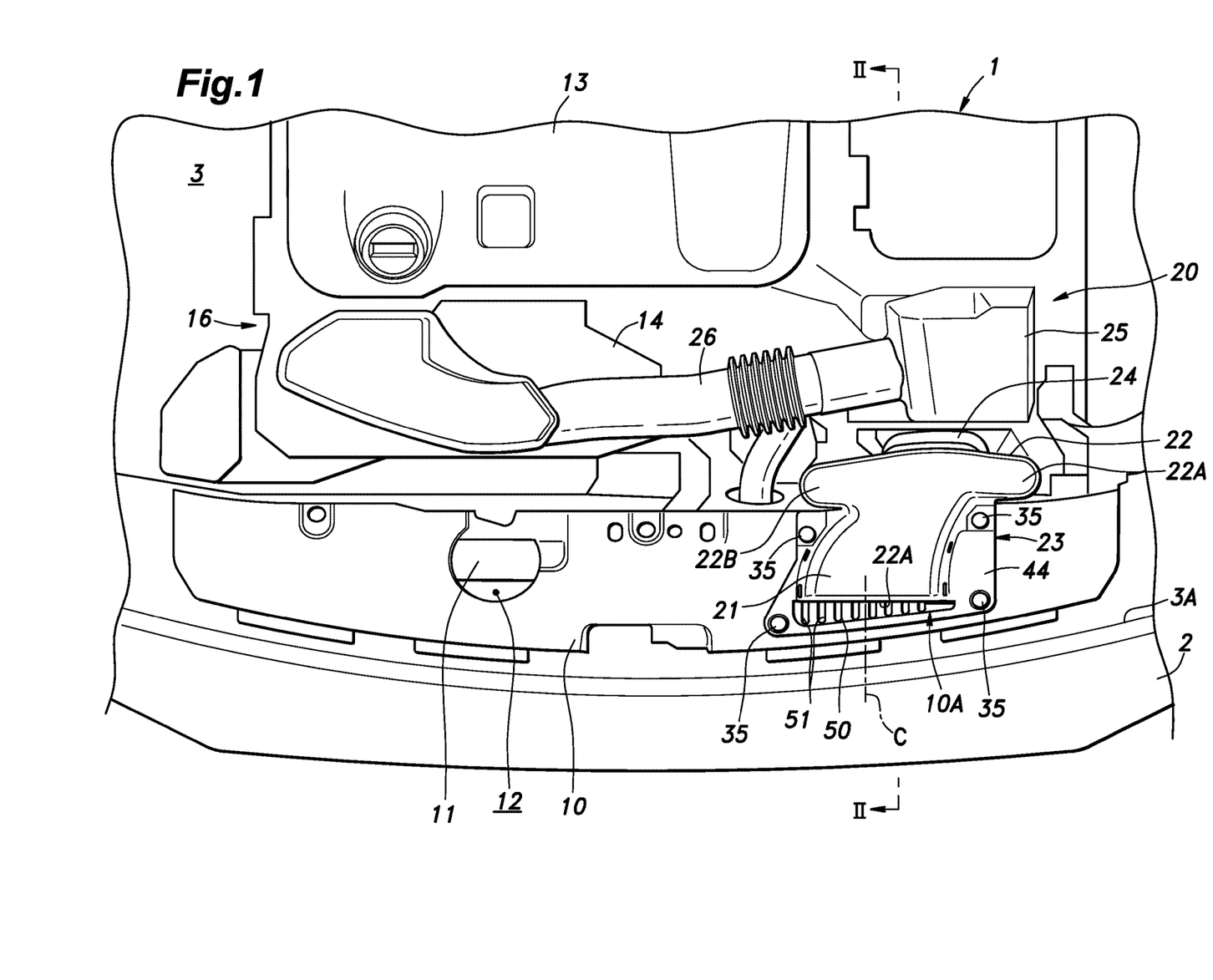
FIG. 1 is a plan view of a front part of a motor vehicle according to an embodiment of the present invention.
Figure 2:
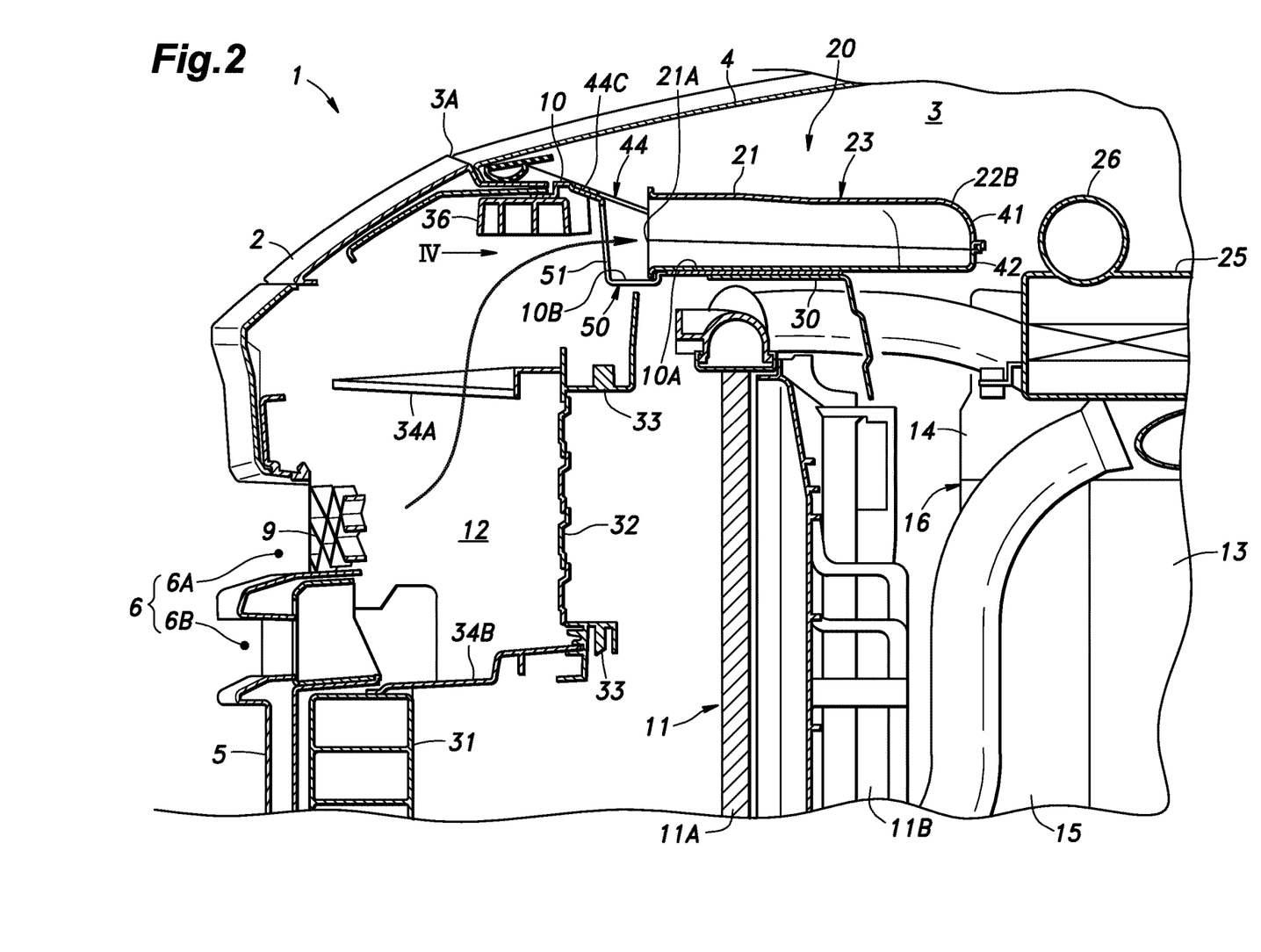
FIG. 2 is a sectional view taken along line II-II of FIG. 1.

FIG. 1 is a plan view showing a front part of a motor vehicle 1 according to the embodiment of the present invention, and FIG. 2 is a sectional view taken along line II-II of FIG. 1. An engine room 3 is defined in a front part of a vehicle body 2. An engine hood 4 (FIG. 2) covers the engine room 3 from above. The engine hood 4 and other devices not relevant to the present invention are omitted from illustration in FIG. 1.

A front bumper 5 extends laterally at the front end of the vehicle body 2. An upper vehicle body opening 6 (FIG. 2) is defined above the upper edge of the front bumper 5, and a lower vehicle body opening (not shown in the drawings) is defined below the lower edge of the front bumper 5. A pair of front lights (not shown in the drawings) are provided on either lateral end of the front end of the vehicle body 2. The upper vehicle body opening 6 includes an upper opening 6A and a lower opening 6B which are located one above the other and extend laterally between the two front lights. The upper opening 6A is fitted with a front upper grill 9 (FIG. 2).

A front bulkhead having a frame structure is provided in a part of the engine room 3 at a certain distance from the part of the vehicle body 2 defining the upper vehicle body opening 6, and an engine radiator 11 is supported by the front bulkhead. A cover member 10 made of a plastic sheet member extends from the upper end of the front bulkhead to the opposing front end part of the vehicle body 2 so as to cover an upper part of a space 12 defined between the front bulkhead and the opposing front end part of the vehicle body 2 (or between the upper vehicle body opening 6 and the radiator 11). The cover member 10 thus extends substantially horizontally under the engine hood 4.

A rear part of the engine room 3 accommodates an internal combustion engine 13 having a laterally extending crankshaft. The intake ports of the engine 13 face rearward, and the exhaust ports of the engine face forward. A turbocharger 14 having a turbine and a compressor is attached to the front side of the engine 13, and a vertically extending catalytic converter 15 (see FIG. 2) is provided under the turbocharger 14. The turbocharger 14 and the catalytic converter 15 form an exhaust system 16 of the engine 13 jointly with exhaust pipes and mufflers. The exhaust gas expelled from the front side of the engine 13 is passed through the turbocharger 14 and the catalytic converter 15, and is released to the atmosphere from the rear end of the vehicle body 2 after being passed through under the engine 13.

The engine room 3 is further provided with an intake system 20 for supplying intake air to the engine 13. The intake system 20 includes an intake duct module 23 in an upstream end part thereof, and the intake duct module 23 includes a duct portion 21 defining a hollow interior having an air inlet 21A, and a pair of lateral extensions 22A and 22B (22) integrally formed with the duct portion 21 to define small chambers communicating with the hollow interior of the duct portion 21. The intake duct module 23 rests on and is fixedly attached to a left hand side part of the cover member 10.

As shown in FIG. 2, a rear end part of a bottom wall of the intake duct module 23 is connected to a connecting pipe 24 extending downward and having a downstream end connected to an air cleaner 25. The connecting pipe 24 is made of flexible material, and has a laterally elongated cross section. The air cleaner 25 consists of a rectangular box, and is positioned leftward of the engine 13, and slightly ahead of the front side of the engine 13. The downstream end of the connecting pipe 24 is connected to an inlet of the air cleaner 25 formed in the bottom wall thereof. A downstream side duct 26 extends laterally from an upper part of the right side of the air cleaner 25, and the downstream end of the downstream side duct 26 is connected to the compressor of the turbocharger 14. The intake air drawn into the intake duct module 23 is thus forwarded to the turbocharger 14 to be compressed therein, and is then forwarded to the engine 13 via a downstream side duct not shown in the drawings and an intake manifold provided on the rear side of the engine 13.

As shown in FIG. 2, under a rear edge part of the cover member 10 is positioned an upper cross member 30 of the front bulkhead. The upper cross member 30 extends laterally, and is made of a sheet metal strip, an angle member, a channel member or a combination of such members. In the illustrated embodiment, the upper cross member 30 is formed with a pair of sheet metal strips which are laid onto one another so as to define an L-shaped cross section by including a horizontal upper wall and a rear wall depending from the rear edge of the upper wall.

The radiator 11 includes a radiator core 11A received in the front bulkhead, a radiator fan provided on a rear side of the radiator core 11A, and a shroud 11B covering the fan from behind, and defining an air outlet facing rearward. The radiator 11 is provided in a part of the engine room 3 located at a laterally central part of the vehicle body 2, and is fixedly attached to the upper cross member 30 and a lower cross member (not shown in the drawings) of the front bulkhead.

A bumper beam 31 extends laterally behind the front bumper 5, and has two ends that are attached to the vehicle body 2 via extensions not shown in the drawings. An active grill shutter 32 is positioned between the upper vehicle body opening 6 and the radiator 11, and is retained by a frame member 33 which is attached to the upper cross member 30 at an upper end thereof and to the lower cross member at a lower end thereof. An upper flow guide plate 34A extends substantially horizontally forward from an upper part of the frame member 33, and a lower flow guide plate 34B extends substantially horizontally forward from a lower part of the frame member 33 so as to guide the air admitted from the upper vehicle body opening 6 into the active grill shutter 32. The front end of the lower flow guide plate 34B is supported by the upper surface of the bumper beam 31. The upper flow guide plate 34A and the lower flow guide plate 34B jointly define an air passage leading to the active grill shutter 32.

Figure 3:
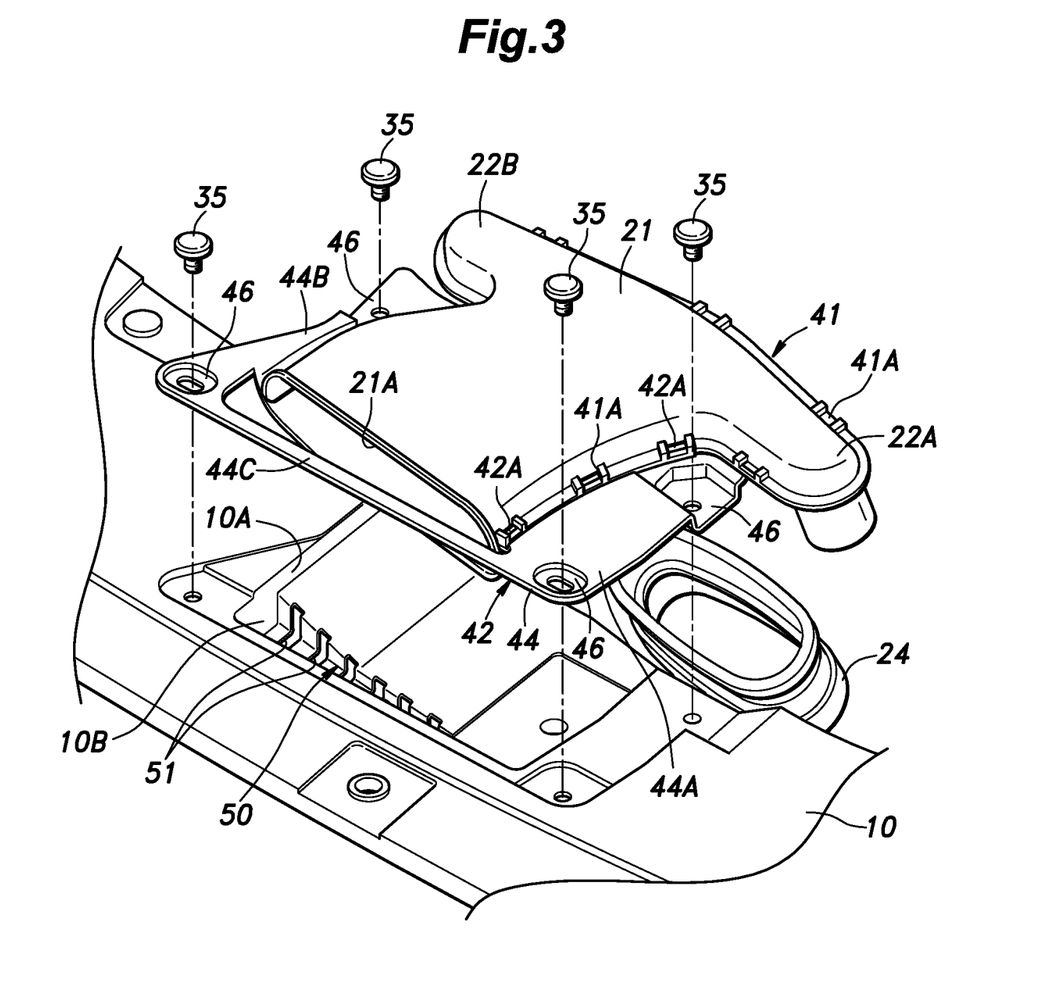
FIG. 3 is a perspective view of an intake duct mounting structure shown in FIG. 1.

As shown in FIGS. 1 and 3, a rear edge part of the cover member 10 is placed on the upper surface of the upper cross member 30, and is attached to the upper cross member 30 by fasteners 35 used for securing the intake duct module 23. A front edge part of the cover member 10 is supported by a support member 36 which is fixedly attached to the lower surface of a part of the vehicle body 2 defining a front edge of the upper opening 3A of the engine room 3. The support member 36 is formed with grid-like ribs on the lower surface thereof for an improved stiffness, and supports the cover member 10 from below with a smooth upper surface of the support member 36.

FIG. 3 is a perspective view of the mounting structure of the intake duct module 23. The duct portion 21 of the intake duct module 23 extends substantially in the fore and aft direction with a slight leftward slant toward the rear end thereof. The duct portion 21 is provided with a laterally elongated cross section, and slightly flares out toward the front end thereof. Therefore, the duct portion 21 of the intake duct module 23 is provided with a trapezoidal shape (with a right side slanting rightward toward the front end thereof and a left side extending substantially in the fore and aft direction) in plan view. The front edge of the duct portion 21 defining the air inlet 21A extends substantially laterally in plan view so that the axial line of the duct portion 21 at the air inlet 21A extends in the fore and aft direction or the air inlet 21A substantially faces forward.

The axial line or the facing direction of the air inlet 21A may be considered as the direction of the air flow into the air inlet 21A. In the illustrated embodiment, the lateral direction of the duct portion 21 coincides with the lateral direction of the vehicle body 2. In particular, in the illustrated embodiment, the engine 13 is positioned laterally centrally in the engine room 3, and the intake duct module 23 is positioned on one side of the engine room 3 or on the left hand side of the engine room 3.

The lateral extensions 22A and 22B consist of interference type resonator chambers provided on either lateral side of the rear end part of the duct portion 21. The first lateral extension 22A extends leftward from the rear end part of the duct portion 21, and the second lateral extension 22B extends rightward from the rear end part of the duct portion 21 so that the intake duct module 23 is provided with the shape of letter T in plan view. The first lateral extension 22A extends downward after extending leftward, but the second lateral extension 22B extends simply rightward along a horizontal direction.

The intake duct module 23 is formed by combining an upper half 41 and a lower half 42. The lower half 42 is made of a relatively rigid plastic material such as PP (polypropylene), and is provided with a lateral flange 44 extending from the side edges of the main part of the lower half 42. The rear end of the lower half 42 is formed with a connecting pipe portion 45 (FIG. 4) extending substantially downward to be connected to the connecting pipe 24. The upper half 41 is made of relatively soft plastic material such as thermoplastic elastomer. The upper half 41 and the lower half 42 thus jointly define a laterally elongated, track-shaped cross section.

The peripheral part of the main part of the lower half 42 is provided with a plurality of engagement claws 42A projecting upward, and the corresponding parts of the peripheral part of the upper half 41 are provided with engagement holes 41A configured to engage the corresponding engagement claws 42A.

The flange 44 includes a left section 44A extending leftward from the left edge of the duct portion 21, a right section 44B extending rightward from the right edge of the duct portion 21, and a front section 44C extending laterally along the front end of the duct portion 21 and connecting the left section 44A and the right section 44B to each other. The left section 44A and the right section 44B are provided with securing portions 46 (consisting of four holes) for securing the flange 44 to the cover member 10. The flange 44 thus extends beyond the lateral contour of the recess 10A. The two of the securing portions 46 on the front side are positioned slightly ahead of the front end of the duct portion 21, and the remaining two securing portions 47 on the rear side are positioned behind the front end of the duct portion 21. Thereby, the intake duct module 23 can be securely attached to the cover member 10.

The part of the cover member 10 on which the intake duct module 23 rests is formed with a recess 10A which opens out in a rear end thereof. The front edge of the recess 10A is slightly curved such that the left side part thereof recedes with respect to the right side part thereof so as to conform to the curved contour of the front end of the vehicle body 2. The front end part of the bottom wall of the recess 10A consists of a deep region 10B provided with a greater depth than the general surface of the remaining part of the recess 10A. The front edge of the deep region 10B which coincides with the front edge of the recess 10A is curved as mentioned earlier, but the rear edge of the deep region 10B aligns with or extends in parallel with the front edge of the air inlet 21A. Therefore, the bottom wall of the deep region 10B is provided with a progressively greater fore and aft dimension toward the right side or the inboard side of the vehicle body 2.

The lower half 42 of the intake duct module 23 is received in the recess 10A, and the upper half 41 of the intake duct module 23 protrudes upward from the recess 10A. Because the intake duct module 23 is partly received in the recess 10A in this manner, the upward protrusion of the intake duct module 23 from the cover member 10 can be minimized. In particular, the air inlet 21A of the intake duct module 23 is spaced from the front edge of the recess 10A so that the air inlet 21A communicates with the region of the engine room 3 located above the cover member 10 via the front end part of the recess 10A or the deep region 10B with a minimum flow resistance.

Figure 4:
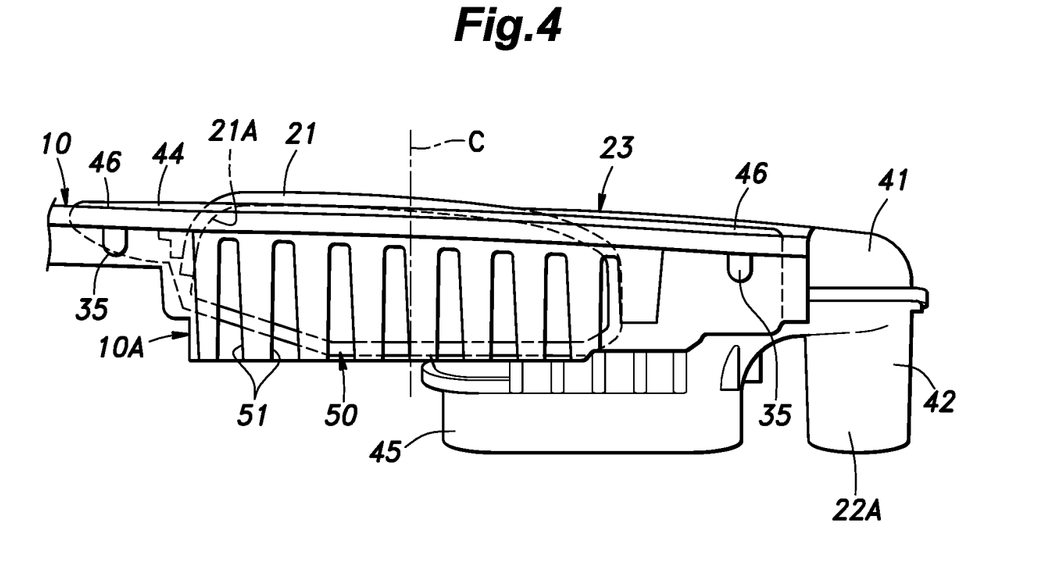
FIG. 4 is a view seen in the direction indicated by arrow IV of FIG. 2.

FIG. 4 is a view as seen in the direction indicated by arrow IV of FIG. 2. The cover member 10 extends along a part of the vehicle body 2 extending along the periphery of the upper opening 3A of the engine room 3, and slightly slants downward toward the left side (outboard side) of the vehicle body 2. The bottom surface of the deep region 10B slants upward toward the left side (outboard side) of the vehicle body 2 so that the depth of the deep region 10B progressively decreases toward the left side (outboard side) of the vehicle body 2.

The front wall of the recess 10A is formed with a plurality of the slots 51 extending vertically and arranged at a substantially regular interval along the lateral direction. These slots 51 extend continuously in the bottom wall of the deep region 10B in the fore and aft direction (or in parallel with an axial direction of the intake duct member 23), and then in the vertical wall defining the rear edge of the deep region 10B. The slots 51 of the illustrated embodiment have a substantially same lateral width. The slots 51 have mutually different lengths such that those on the right hand side have greater lengths whereas those on the left hand side have smaller lengths. More specifically, in the illustrated embodiment, the slots 51 are progressively more elongated (and hence, larger opening areas) from the left hand side to the right hand side. As a result, the opening area per unit lateral length progressively increases from the left hand side to the right hand side of the deep region 10B.

The mode of operation of the engine intake structure of the illustrated embodiment is discussed in the following.

Because the space 12 created between the upper vehicle body opening 6 and the front side of the radiator 11 is covered by the cover member 10, the external appearance of the engine room 3 improves, and the air heated by the engine 13 is prevented from being forwarded to the radiator 11.

The part of the cover member 10 immediately upstream of the air inlet 21A of the intake duct module 23 is formed with an opening 50 passed through the cover member 10 so that the fresh air drawn from the upper vehicle body opening 6 to the engine room 3 (the space 12 in front of the radiator 11) is favorably forwarded, via the opening 50, to the air inlet 21A of the intake duct module 23 which rests upon the cover member 10.

Because the air inlet 21A is located in the front end part of the recess 10A or the deep region 10B, moisture and other foreign matters are prevented from being drawn into the intake duct module 23 via the air inlet 21A. Because the air inlet 21A receives fresh air both from the region above the cover member 10 and the region below the cover member 10, an adequate amount of intake air can be supplied to the engine 13 even when the rotational speed of the engine 13 is high.

As shown in FIGS. 1 and 4, when the air inlet 21A is separated into two equal parts by a vertical center line C, the opening area of the opening 50 on the right hand side of the center line C is substantially greater than the opening area of the opening 50 on the left hand side of the center line C. This is advantageous because the region of the engine room 3 on the right hand side of the center line C is considered to be a higher temperature region while the region of the engine room 3 on the left hand side of the center line C is considered to be a lower temperature region in this case because the air inlet 21A is located on the left hand side of the engine room 3 while the engine 13 is positioned laterally centrally in the engine room 3.

Owing to the uneven distribution of the opening 50 in the lateral direction, the right hand side of the air inlet 21A actively draws the fresh air from the region under the cover member 10 whereas the left hand side of the air inlet 21A draws the fresh air from the region under the cover member 10 to a significantly lesser extent. As a result, the air from the region above the cover member is preferentially drawn from the left hand side of the air inlet 21A which is located in a lower temperature region of the engine room 3 as comparted to the right hand side of the air inlet 21A which is in a higher temperature region of the engine room 3 which is more exposed to the heat of the engine 13.

According to a different aspect of the present invention, the lateral distribution of the opening area of the air inlet 21A may be defined in terms of the centroid of the opening 50. In this case, the centroid of the opening 50 may be preferably located on the right hand side of the air inlet 21A with respect to the center line C.

In the foregoing embodiment, the opening 50 consists of the slots 51 so that an adequate opening area can be ensured while large foreign matters are screened and prevented from passing through the opening 50. Also, the mechanical stability of the member defining the opening 50 can be ensured.

Because the opening 50 is located ahead of the radiator 11, the fresh air introduced into the engine room 3 from the upper vehicle body opening 6 directly passes through the opening 50 and is drawn into the intake duct module 23 located on the upper side of the cover member 10. As a result, the air warmed by the radiator 11 is prevented from being drawn into the air inlet 21A of the intake duct module 23.

The engine 13 is typically oriented such that the intake ports thereof face rearward while the exhaust ports thereof face forward. As a result, the central part of the engine room 3 may become fairly high in temperature. However, the present invention favorably prevents the heat from the exhaust system of the engine to be forwarded to the air inlet 21A.

As shown in FIG. 1, in the illustrated embodiment, the turbocharger 14 which is known to actively emit heat is placed in front of the engine 13. However, according to the foregoing embodiment, the air surrounding the turbocharger 14 is effectively prevented from being drawn into the air inlet 21A of the intake duct module 23.

The opening 50 is provided in the part of the cover member 10 located inside the recess 10A, and the air inlet 21A of the intake duct module 23 is also positioned inside the recess 10A. Thereby, while the air inlet 21A is favorably exposed to the region of the engine room 3 located above the cover member 10, a large opening area is permitted for the opening 50 formed in the recess 10A so that the air inlet 21A is favorably communicated with the region of the engine room 3 located below the cover member 10. Also, the placement of the intake duct module 23 in the recess 10A allows the intake duct module 23 to be positioned in a space efficient manner.

Because the intake duct module 23 is attached to the cover member 10 via the flange 44 extending laterally well beyond the edges of the recess 10A, the intake duct module 23 can be attached to the cover member 10 in a highly secure manner.

The present invention has been described in terms of a preferred embodiment thereof, but is not limited by the illustrated embodiment, and can be modified and substituted in various ways without departing from the scope of the present invention. For instance, the intake duct module 23 was provided on the left hand side of the vehicle body 2 in the illustrated embodiment, but may also be provided on the right hand side of the vehicle body 2. In such a case, the entire arrangement may consist of a mirror image of the illustrated embodiment. Also, in the foregoing embodiment, description was made of an intake structure for a motor vehicle, but the present invention may be widely applied to intake structures for other types of vehicles, such as a railway vehicle.

The invention claimed is:

1. An intake structure for an internal combustion engine of a vehicle, comprising:
   a vehicle body opening formed in a part of a vehicle body located in a front end part of an engine room of the vehicle;
   a cover member covering a space defined between a front side of a radiator provided in a front part of the engine room and the vehicle body opening from above; and
   an intake duct member resting on the cover member and having an air inlet;
   wherein a part of the cover member adjoining the air inlet is formed with an opening communicating the air inlet with the space, the opening defining a larger opening area in a part thereof located on a higher temperature region side of the engine room with respect to a laterally central part of the air inlet than in a part thereof located on a lower temperature region side of the engine room with respect to the laterally central part of the air inlet, and the opening comprising a plurality of slots each extending in parallel with an axial direction of the intake duct member, and arranged in a lateral direction; and wherein the intake duct member is received in a substantially complementary recess formed on an upper surface of the cover member, the recess having a vertical front wall and a bottom wall and opening out in a rear end thereof.

2. The intake structure as defined in claim 1, wherein the intake duct member is positioned so as to be offset to one side of the vehicle body, and the air inlet is provided on a front end of the intake duct member, and wherein the higher temperature region side of the engine room is located on an inboard side of the air duct member, and the lower temperature region side of the engine room is located on an outboard side of the air duct member.

3. The intake structure as defined in claim 1, wherein the slots are progressively more elongated toward the high temperature region side of the engine room.

4. The intake structure as defined in claim 1, wherein the recess includes a deep region located in a front end part of the recess and provided with a greater depth than a general bottom surface of the recess.

5. The intake structure as defined in claim 4, wherein the slots extend in the vertical front wall of the recess, the bottom wall of the deep region of the recess and a vertical rear wall of the deep region of the recess.

6. The intake structure as defined in claim 1, wherein the cover member is supported by an upper cross member of a front bulkhead supporting the radiator.

7. The intake structure as defined in claim 1, wherein the engine is positioned laterally in the engine room with an exhaust side thereof facing forward.

8. The intake structure as defined in claim 7, wherein a turbocharger is attached to a front side of the engine.

* * * * *